Jan. 21, 1964    D. W. DAVIDSON ETAL    3,118,774
DETECTION OF SPOILAGE
Filed Sept. 1, 1960
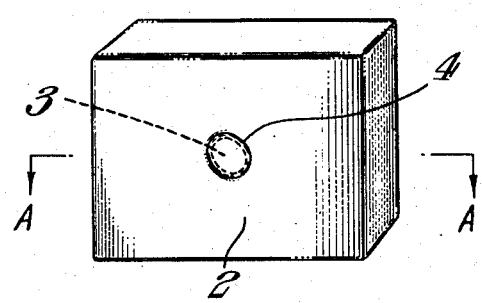
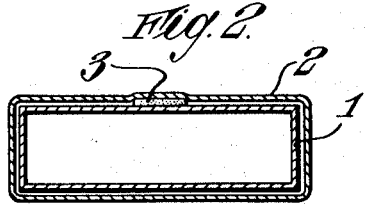

United States Patent Office 3,118,774
Patented Jan. 21, 1964

1

3,118,774
DETECTION OF SPOILAGE
Donald West Davidson and Keith U. Ingold, Ottawa, Ontario, Canada, assignors to National Research Council, Ottawa, Ontario, Canada, a body corporate of Canada
Filed Sept. 1, 1960, Ser. No. 53,508
14 Claims. (Cl. 99—192)

This invention relates to temperature responsive elements to be used in association with products that are susceptible to spoilage by exposure to temperatures in excess of a given maximum temperature, which may for convenience be referred to as the spoilage temperature. Such products include pharmaceuticals, photographic material and above all, frozen products, especially food products. The invention will be described mainly with reference to frozen foods but it is emphasized at the outset that the temperature responsive elements of the invention may be applied to any product in respect of which it is important to ascertain, by visual examination of the packaged product, whether the product has been exposed to temperature conditions capable of causing spoilage.

Refrigeration is used to prevent spoilage of products which deteriorate by bacterial action or otherwise when exposed to normal temperatures. Nowadays, many food products are frozen immediately they are ready for the market and are kept under refrigeration until sold to the public. This practice offers advantages over the traditional practice of canning the products in that the flavour and texture of the products are preserved substantially unchanged.

Great care is exercised by the producers of such frozen products in order to ensure that as little time as possible elapses between the moment that the products are ready for packaging and the moment that they are brought under refrigeration conditions. Such care is essential if the purchaser is to have the benefits of this technique. Unfortunately, the condition of the product when it reaches the customer is not solely dependent on the efficiency with which the packaging has been effected but also on the history of the packaged product between its packaging and its purchase by the customer. Suitable facilities are provided for ensuring that during the whole of the period required to transfer the frozen product from the packer to the retailer the packages are not allowed to be exposed to a temperature above the thaw temperature, i.e., the temperature regarded as the safe maximum for preserving the properties of the frozen product. However, despite these facilities, accident or neglect may contrive to render insufficient the precautions taken.

If the packages have been exposed to too high a temperature for more than a certain length of time thawing of the frozen product will have taken place with adverse effects upon the qualities of the product which should then be regarded as no longer fit for sale. Unfortunately, by design or accident, the packages are all too often refrozen and in due course offered to the public. The deterioration of the product may have extended so far that it is no longer fit for consumption but in practice this seldom happens. What frequently happens is that the flavour and texture of the product have been severely impaired so that the customer is dissatisfied and the packers reputation is injured.

It would therefore be desirable if packaged frozen products could be provided with a device which would indicate to the potential purchaser whether they had been properly treated and would issue a warning not to purchase when the packages had suffered such exposure to a temperature above the thaw temperature that high quality of the product could no longer be guaranteed. The need for such a thaw-indicating device has been appreciated for some time and various devices have been proposed. However, frozen food continues to be offered for sale without any thaw-indicating device associated with it and it appears that none of the prior proposals are acceptable.

It is evident that the device must be temperature-responsive and thaw-indicating devices previously proposed comprise a varied selection of expedients fulfilling this requiremnet. However, in order to be satisfactory in practice, the device must meet two other fundamental requirements as follows:

(i) The device should not indicate thawing unless thawing has extended into the frozen product itself. Those devices of the prior art which are attached to the surface of the package are prone to signal that the package has been thawed when all that has happened is that the package has been momentarily subjected to too high a temperature, for example by the temporary opening of a refrigerated sales cabinet. Despite the fact that the outside of the package has been at thawing temperature long enough to actuate an indicator positioned on the outside of the package, there may well have been no thawing of the contents of the package, and the use of such an over-sensitive device would cause rejection of much merchandise which is still in good condition.

(ii) The device must be capable of being produced at low cost for and of being applied to the packages in a simple and cheap manner, however efficient it might be, it cannot be used in practice if the cost is too high. Bearing in mind that packages of frozen food are sold quite cheaply and that the permissible cost of the indicator will be related to the net cost of the individual package it will be realized that this is a real difficulty.

Previously proposed thaw-indicating devices are incapable of fulfilling both these requirements. Most of them suffer from the shortcoming mentioned above of prematurely indicating that the packages have been thawed. Those which do not have this defect and given an indication of thawing only after a time comparable with the time required to cause deterioration of the frozen product itself are incapable of being used in commerce because they are to elaborate and hence too expensive.

So far as the applicants are aware, the nearest thing to a satisfactory thaw-indicator so far proposed is the thaw-indicator described in U.S. Patent No. 2,560,537, issued July 17, 1951, to A. A. Andersen. This patent recognizes the deficiency of thaw-indicators which respond to surface thawing of the packages and provides a thaw-indicator that, although applicable to the surface of the package, does not have this defect. In Andersen's thaw-indicator the development of a visible signal of thawing depends on diffusion of an organic solvent, usually 2-phenoxyethanol, through a porous material whereby a dyestuff in solution in the solvent is moved to a visible section of the device. This diffusion consumes a definite period of time so that if the package is not exposed to too high a temperature for such a length of time that significant damage is done to the frozen product itself the indicator does not provide the visible signal. In order to ensure that the period of time required for the solvent to diffuse along the diffusion path provided is of appropriate duration it is necessary to provide a diffusion path of considerable length. This diffusion path consists of a strip of paper encased in a transparent tube which is folded to crimp the tube upon the strip.

Andersen's thaw-indicator is undoubtedly superior to previous thaw-indicators but it fails to fulfill the requirements mentioned above, namely that of being cheaply produced and simply applied to the packages. A long diffusion path has to be provided, the indicator has to be encased in a transparent tube and it is necessary to provide a cover member having an opening through which the visible signal can be observed. Also, Andersen's indicator suffers from a defect common to other thaw-indicators, one which has not previously been recognized. This defect originates from the use of a substance which has a definite melting point. It will be appreciated that when the frozen package has been raised to a temperature only slightly (say 1° F.) above the thaw temperature it would be desirable for development of the visual indication of thawing to proceed at a much slower rate than if the temperature were well (say 20° F.) above the thaw temperature. Neither Andersen's indicator nor any of the other previously known indicators depending on the melting of a solid can achieve this effect because they involve the use of a substance which at a certain temperature passes from the solid to the liquid state. Below that temperature no development of the indicator takes place; above it the development is equally rapid, apart from a slight acceleration due to the effect of increasing temperature on viscosity, whether the excess temperature is small or large.

The above remarks concerning the disadvantages of previously known thaw-indicators for frozen foods apply also to the use of similar types of temperature-responsive elements on products other than frozen foods.

It is an object of the present invention to provide a temperature-responsive element which is of simple construction and is adapted to be simply attached to the surface of a package containing a product that is susceptible to spoilage by exposure to unduly high temperature conditions.

It is a further object to provide such a temperature-responsive element having the further characteristic that it indicates spoilage only when the packaged product has been above the spoilage temperature for such a time and at such a temperature that the contents of the packaged product may properly be regarded as no longer fit for sale.

It is a further object of the invention to provide a temperature-responsive element which depends, for the visual indication of spoilage, on the diffusion of an indicating substance along a short diffusion path.

It is a further object of the invention to provide a temperature-responsive element the sensitivity of which to an excess of temperature over the spoilage temperature is a function of that excess; over a range of temperature in the neighbourhood of the spoilage temperature.

These and other objects of the invention, which will hereinafter become apparent, are achieved by the provision of a temperature-responsive element comprising a frozen mass of an indicating substance selected from the group consisting of inert oils and waxes and mixtures thereof, said indicating substance having a melting range in the neighbourhood of the spoilage temperature and in contact with said frozen mass a permeable member which provides a diffusion path along which said indicating substance is diffusible to give a visual indication of spoilage.

The term "inert" is used to designate oils and waxes which are not chemically reactive and undergo little or no oxidation when exposed to air for long periods. This requirement excludes very many natural oils and waxes which upon exposure to air harden or become rancid so that their physical properties are completely transformed.

The indicating substance used according to the invention does not have a sharp melting point; there is a range of temperature over which it is in a state intermediate between the solid and liquid states. As a result, diffusion of the thawing indicating substance through the permeable member takes very much longer than would be taken for a compound having a sharp melting point to diffuse, upon liquefaction, through a porous member of similar nature and dimensions. By using an indicating substance according to the present invention it is possible to provide a very short diffusion path for the indicating substance to traverse before giving the indication of spoilage and, because of the slow speed of diffusion, still ensure that this indication is not premature.

Furthermore, within the range of temperature over which the substance is in a state intermediate between the solid and liquid states, herein referred to as the melting range, the speed of diffusion is a function of the excess of temperature over the spoilage temperature. When the temperature first rises above the lower limit of the melting range, the indicating substance changes from a solid to a highly viscous pseudo-liquid which diffuses through the permeable member at a very slow rate. As the temperature rises still more, the viscosity of the pseudo-liquid falls progressively until the upper limit of the melting range is reached; the oil is then a true liquid and from then on decrease in viscosity takes place much more slowly, in the same way as for any other true liquid. It will be seen that the progressive decrease in viscosity over the melting range will lead to a corresponding progressive increase in the rate at which the indicating substance diffuses through the permeable member. This is most desirable because, the rate of deterioration of the product depends on the difference between the temperature of its environment and the spoilage temperature. When this difference is quite small the rate of deterioration is slow; as it increases, the rate of deterioration increases. It is advantageous if this can be taken into account and especially so in the temperature range just above the spoilage temperature for it is in this range that a small change of temperature causes a large change in the rate of deterioration. The temperature-responsive element of the invention is able to do this because within the temperature range lying between the upper and lower limits of the melting range the rate of diffusion of the indicating substance through the permeable member is affected by temperature increases in a manner analogous to the manner in which the rate of deterioration of the contents of the package is affected.

As indicated above only inert oils and waxes are suitable for use according to the invention. It is preferred to use hydrocarbon oils and waxes, for the following reasons:

(1) Hydrocarbon oils and waxes derived from petroleum can be very readily obtained on the open market with constant physical properties. In contrast, natural products, e.g., oils and waxes of animal or vegetable origin have a very variable composition and, therefore, variable physical characteristics. To obtain a constant time on the temperature-responsive element it is in general necessary if using such a natural oil or wax to re-measure the indicator time for each fresh batch of oil or wax and perhaps to change the length of the diffusion path for each batch.

(2) Hydrocarbon oils and waxes are very inert chemically and, in particular they are generally not oxidized by air at room temperature. In contrast, saponifiable oils and waxes (e.g., castor oil) and other esters of fatty acids (e.g., sorbitan mono-oleate and mono-laurate, butyl stearate methyl palmitate, etc.) are slowly oxidized at room temperature and tend to become rancid. Thus, it is very difficult to obtain an odorless saponifiable oil or wax, whereas hydrocarbon oils and waxes are usually completely odorless.

(3) The melting range of a hydrocarbon oil can be readily adjusted not only by the refining techniques used on the oil, i.e., the cut taken as regards viscosity, viscosity index and melting range, but also by the addition of substances known as pour point modifiers. A very large number of such modifiers are readily available since they constitute a very important oil additive in commercial use.

(4) Hydrocarbon oils and waxes are very much cheaper than pure chemical compounds and are also cheaper than most natural oils or waxes.

Accordingly, although envisaging the use of inert oils and waxes in general as indicating substances preference is given to hydrocarbon oils and waxes and mixtures thereof.

The selection of an oil or wax or a mixture thereof having a suitable melting range presents no difficulty. As stated, the melting range must be in the neighbourhood of the spoilage temperature. This temperature will frequently be the freezing point of water for the invention is especially concerned with thaw-indicators for use on packaged frozen food but it could be any temperature regarded as the permissible maximum storage temperature for a particular product. It is usually desirable to have the lower limit of the melting range close to the spoilage temperature so that the melting range coincides with the critical range of temperature just above the spoilage temperature as discussed above. Preferably the indicating substance has a high viscosity so that the length of the diffusion path through the permeable member can be kept as short as possible.

It will be understood that each kind of packaged product presents an individual problem and calls for a temperature-responsive element designed to meet the special requirements of that products. The time which should elapse before the temperature-responsive element signals spoilage depends on the nature of the product and the size and constitution of the package. Having once fixed what is the maximum safe period of exposure of an average excess temperature the temperature-responsive element is then constructed so as to give a warning signal after an elapsed time equal to that safe period under similar temperature conditions. The time required for the visual indication of spoilage to develop can be adjusted by varying the melting range and viscosity, of the indicating substance and by varying the length of the diffusion path provided by the permeable member. Judicious selection of these parameters enables the time of development to be fixed with fair accuracy.

The fact that the indicating substances do not have a sharp melting point considerably facilitates the application of the temperature-responsive elements of the invention to packages. Conveniently, the indicating substance is cooled to a greasy consistency and a blob is applied to the surface of the package. The blob is then covered by a permeable member, for example, of cardboard, of such thickness as to provide a diffusion path of appropriate length. Under the referigerating conditions pertaining during packaging the blob is quickly frozen hard. Alternatively, a blob of the indicating substance may be formed on the permeable member and this member then applied to the package.

The temperature-responsive element may be on the outer wrapping of the package or it may be on an inner wrapping with an outer wrapping over it, a window being provided in the outer wrapping so that the surface of the permeable member is visible without removal of the outer wrapper. The permeable member can indeed be constituted by an outer wrapper of suitable material and thickness.

In its simplest form the temperature-responsive element of the invention thus comprises a frozen blob of indicating substance concealed by a permeable member of appropriate thickness, diffusion of the substance through the permeable member causing the substance to become visible on the outer surface thereof. If desired, the indicating substance can contain colouring matter, for example a dyestuff dissolved therein.

Experiments on a temperature-responsive element of the invention were carried out using 12 oz. frozen packets of peas as samples. The peas are wrapped in a waxed cardboard container (thickness=0.017 in.) and this is surrounded by a waxed paper wrapper with the manufacturer's name, etc., on it. In the experiments the wax wrapping paper was removed from the package so that the temperature-responsive element could be attached directly to the waxed cardboard.

A packet cooled to −13° C. (+9° F.) when laid flat on a wooden board took 5 hrs. to thaw (i.e., for the center of the package to reach about 35° F.). When the packet was stood on end to present a larger surface area to the air it took 4 hrs. to thaw. The air temperature was 70° F.

A red oil soluble dye (oil scarlet) was dissolved in a hydrocarbon oil. A small spot of frozen dyed oil was placed on the frozen package and covered over completely with a piece of paper, cardboard or other oil-permeable material. The packet was then allowed to warm up in a room at 70° F. After a certain length of time a red colour developed on the visible surface of the material covering the dyed oil. By adjustment of the pour point and/or the viscosity of the oil, or by adjustment of the thickness or permeability of the covering material the time taken for the colour to develop could be adjusted between very wide limits. In particular it could be made to correspond with the partial or complete thawing of the packet, or to some critical time thereafter.

It was found that hydrocarbon oils of low viscosity tend to dissolve wax and therefore to soak through the waxed cardboard box after thawing. The length of time required for this to occur increases rapidly as the viscosity of the oil is increased. At high viscosities (v./100° F. >1,000 S.S.U.) this time is much greater than the length of time that most frozen foods could remain thawed without going noticeably bad. A high viscosity oil is therefore to be preferred.

A further advantage of the use of a high viscosity oil is that since they diffuse more slowly than low viscosity oils, a thinner material may be used to cover the spot of dyed oil. The following table gives some results which show the advantages of a thin covering.

Table I

| Cardboard Thickness | Viscosity of Oil at 100° F. | Melting Range, ° F. | Time for indication of spoilage when overheated continuously, minutes | Sum of times required for indication of spoilage when overheating for periods of 1 hr., then refreezing. This procedure repeated until indicator shows spoilage, minutes |
|---|---|---|---|---|
| 0.255 in | 307 | 25/20 | 150 | 120 |
| 0.090 in | 3,430 | 15/10 | 180 | 230 |
| 0.072 in | 5,225 | 35/30 | 375 | 2,500 |

It is important that a short period of exposure to excess temperature or even a large number of such short periods, as will naturally occur during general handling and shipping and during defrosting of a refrigerating system, shall not affect the temperature-responsive element adversely. That is, it is necessary to have an element that will not indicate spoilage when the package has merely been warmed at its surface a few times, and the main bulk of it never overheated. Table I shows that it is therefore advantageous to use a high viscosity oil with a thin covering over it. The reason for this is that although the surface of the covering material in contact with the packet is held at the surface temperature of the package during overheating, the top surface will be at some temperature between room temperature and package surface temperature. The thicker the covering is the warmer its outside surface becomes, and since the viscosity of an oil or wax is very temperature dependent, it diffuses at an accelerating rate as it moves away from the package. In the first example in the table, because of the finite time involved in refreezing the oil after the first 60 min. thawing period (during which refreezing time it continues to diffuse) there was indication of thawing after two 1 hr. periods of thawing whereas when thawed continuously there was no indication of thawing for 150 min. On the other hand, when a thin covering material is used its outside surface is much closer to the surface temperature of the package, so not only does the rate of oil diffusion change less, but also when the package is refrozen, the oil is cooled more rapidly and diffusion ceases more quickly. In the second and third examples therefore the sum of the times required for an indication of thawing in a number of 1 hour periods is greater than the time required on a continuous thaw.

For maximum efficiency the lower limit of the melting range of the indicating substance should coincide with the spoilage temperature. If it is below the thaw temperature there is the possibility that spoilage might be indicated without the product having been rendered unfit for use; if it is above the spoilage temperature the product might be maintained at the spoilage temperature indefinitely without an indication of spoilage being given. In practice some difference between the spoilage temperature and the lower limit of the melting range can often be tolerated, a decision as to permissible latitude in this respect being within the competence of the packagers. The three hydrocarbon oils referred to in Table I would be best suited (so far as melting range is concerned) for use in temperature-responsive elements for products having spoilage temperatures of 20° F., 10° F. and 30° F. respectively.

It is again emphasized that the temperature-responsive element of the invention must be constructed to meet the requirements of the packaged product concerned. The variables involved include the viscosity and melting range of the indicating substance; the thickness, density, porosity and permeability of the permeable member; the thermal conductivity of the package and permeable member; and the spoilage temperature. It would be possible to write an equation taking these (and probably other) variables into account. In practice such an equation would merely be confusing; a few simple experiments serve to ascertain the optimum values for a given product. This is brought out by Table II which gives the results of experiments on packages of frozen food (smaller than the packages of peas referred to above) stored at 10° F. and allowed for the purpose of the experiment to warm up in a room at 70° F. The real thawing time of a package was actually 100 minutes. The wide range over which the time for a visual indication of spoilage to develop can be varied is clearly demonstrated. For the particular package utilized this time could readily be adjusted to correspond to the maximum permissible degree of thawing.

*Table II*

| Oil Viscosity at 100° F. (S.S.U.) | Viscosity Index | Melting Range (° F.) | Thickness of Oil Permeable Member (ins.) | Density of Oil Permeable Member (gm./cm.$^3$) | Time for Temperature Responsive Element To Develop Signal (mins.) |
|---|---|---|---|---|---|
| 873 | 85 | 33/27 | 0.0072 | 1.02 | 6 |
| 1,961 | 85 | 33/27 | 0.0072 | 1.02 | 35 |
| 3,049 | 85 | 33/27 | 0.0072 | 1.02 | 65 |
| 4,137 | 85 | 33/27 | 0.0072 | 1.02 | 120 |
| 5,225 | 85 | 33/27 | 0.0072 | 1.02 | 170 |
| 873 | 85 | 33/27 | 0.0185 | 0.887 | 40 |
| 873 | 85 | 33/27 | 0.0090 | 0.866 | 9 |
| 873 | 85 | 33/27 | 0.0066 | 0.859 | 5 |
| 5,225 | 85 | 33/27 | 0.0185 | 0.887 | 600 |

One embodiment of the invention will be described with reference to the accompanying drawings in which:

FIG. 1 shows a package containing a frozen food product, and

FIG. 2 is a sectional view of the package of FIG. 1 along the line A—A.

The package of FIGS. 1 and 2 comprises an inner wrapper 1 within which is contained frozen food (not shown), and an outer wrapper 2. Before the outer wrapper 2 is applied to the package, a small quantity of a hydrocarbon oil, cooled to a greasy consistency, is applied to the inner wrapper 1. This oil solidifies, under the refrigerating conditions pertaining during packaging, to a frozen blob 3. The outer wrapper 2 is of a material which is permeable to oil and constitutes the permeable member referred to above.

The melting range of the hydrocarbon oil and the nature and thickness of the outer wrapper 2 are so chosen that when the package has been exposed to a temperature above the spoilage temperature for such a length of time that thawing has occurred of the frozen food within the package the oil has been able to diffuse through the outer wrapper 2 to give a visual indication of spoilage. If the time of such exposure is less than the time regarded as the safety limit, the oil does not become visible and is refrozen on return of the package to refrigeration. It has, however, traversed part of the diffusion path through which it has to pass to become visible so that subsequent exposure of the package to a temperature above the thaw temperature will provide a visual indication of spoilage sooner than if there had been no previous exposure. The temperature-responsive element thus has a "memory" for past exposures and is capable of integrating a number of exposures and indicating that the total exposure time of the package to too high a temperature has exceeded a safe minimum.

As shown in FIG. 1 the visible surface of the outer wrapper 2 is marked with a circle 4 slightly larger than the underlying blob 3. The package carries a printed message to the potential purchaser informing him to examine this circle for determining whether the package has been thawed and refrozen. Conveniently the hydrocarbon oil is naturally coloured or contains colouring matter, for example a dyestuff, so that the circle 4 becomes coloured when the oil has diffused through the outer wrapper 3.

The thermally-responsive elements of the invention find their widest use in connection with packaged frozen foods. The spoilage temperatures for such products are in general not far removed from the freezing point of water.

For other products, for example pharmaceuticals, the spoilage temperatures may be much higher and the indicating substance will normally be a wax or a mixture of a wax and an oil.

Examples of indicating substances suitable for use in temperature-responsive elements intended for association with products having relatively high spoilage temperatures are given in Table III.

*Table III*

| | Substance | Melting Range, ° F. |
|---|---|---|
| 1 | Paraffin Wax | 124/118 |
| 2 | 10% Paraffin Wax in 500 Pale Oil | 95/61 |
| 3 | 10% Paraffin Wax in 300 USP Oil | 101/60 |

Emphasis has been placed, in the above description, on the use as indicating substances of hydrocarbon oils and waxes. It is reiterated however that it is also feasible to utilise natural oils and waxes provided that these are inert and do not tend to suffer deterioration which would interfere with their physical properties.

This application is a continuation-in-part of application Serial No. 723,380, filed March 24, 1958, now abandoned.

We claim:

1. A temperature-responsive element for indicating spoilage of a product due to overheating thereof comprising a solid indicating substance selected from the group consisting of hydrocarbon oils and hydrocarbon waxes and mixtures thereof, said indicating substance having an extended melting range over which the indicating substance is in a state intermediate between the solid and the liquid states, said melting range being in the neighbourhood of the spoilage temperature, and in contact with said indicating substance a permeable member which provides a diffusion path along which said indicating substance is diffusible to give a visual indication of spoilage upon exposure to a temperature in excess of the spoilage temperature, the rate of diffusion of said indicating substance along said diffusion path being a function, over the range of temperature defined by said melting range, of both the time of exposure to excess temperature and the magnitude of the excess temperature.

2. A temperature-responsive element according to claim 1 wherein said indicating substance has an extended melting range the lower limit of which is close to the spoilage temperature.

3. A temperature-responsive element according to claim 1 wherein said indicating substance has a high viscosity.

4. A temperature-responsive element according to claim 1 wherein said indicating substance contains colouring matter.

5. A packaged product having associated therewith a temperature-responsive element for indicating spoilage of the product due to over-heating thereof comprising a solid indicating substance selected from the group consisting of hydrocarbon oils and hydrocarbon waxes and mixtures thereof, said indicating substance having an extended melting range over which the indicating substance is in a state intermediate between the solid and the liquid states, said melting range being in the neighbourhood of the spoilage temperature, and in contact with said indicating substance a permeable member which provides a diffusion path along which said indicating substance is diffusible to give a visual indication of spoilage upon exposure to a temperature in excess of the spoilage temperature, the rate of diffusion of said indicating substance along said diffusion path being a function, over the range of temperature defined by said melting range, of both the time of exposure to excess temperature and the magnitude of the excess temperature.

6. A packaged product according to claim 5 wherein said permeable member is an outer wrapping for the package.

7. A thaw-indicator comprising a frozen mass of a hydrocarbon oil having a pour point in the neighbourhood of the thaw temperature and in contact with said frozen mass an oil-permeable member which provides a diffusion path along which said hydrocarbon oil is diffusible to give a visual indication of thawing upon exposure to a temperature in excess of the thaw temperature, the rate of diffusion of said hydrocarbon oil along said diffusion path being a function, over the range of temperature defined by said pour point, of both the time and exposure to excess temperature and the magnitude of the excess temperature.

8. A thaw-indicator according to claim 7 in which said hydrocarbon oil has a pour point the lower limit of which is close to the thaw temperature.

9. A thaw-indicator according to claim 7 in which said hydrocarbon oil has a high viscosity.

10. A thaw-indicator comprising a frozen mass of a hydrocarbon oil having a pour point the lower limit of which is close to the thaw temperature and having a high viscosity and in contact with said frozen mass an oil-permeable member which provides a short diffusion path along which said hydrocarbon oil is diffusible to give a visual indication of thawing upon exposure to a temperature in excess of the thaw temperature, the rate of diffusion of said hydrocarbon oil along said diffusion path being a function, over the range of temperature defined by said pour point, of both the time of exposure to excess temperature and the magnitude of the excess temperature.

11. A thaw-indicator according to claim 10 in which said hydrocarbon oil contains colouring matter.

12. A packaged frozen product having applied to the surface of the package a thaw-indicator comprising a frozen mass of a hydrocarbon oil having a pour point in the neighbourhood of the thaw temperature and in contact with said frozen mass an oil-permeable member which provides a diffusion path along which said hydrocarbon oil is diffusible to give a visual indication of thawing upon exposure to a temperature in excess of the thaw temperature, the rate of diffusion of said hydrocarbon oil along said diffusion path being a function, over the range of temperature defined by said pour point, of both the time of exposure to excess temperature and the magnitude of the excess temperature, whereby the time required for development of said visual indication of thawing is correlated with the extent of deterioration of said frozen product.

13. A packaged frozen product having applied to the surface of the package a thaw-indicator comprising a frozen mass of a hydrocarbon oil having a pour point the lower limit of which is close to the thaw temperature and having a high viscosity and in contact with said frozen mass an oil-permeable member which provides a short diffusion path along which said hydrocarbon oil is diffusible to give a visual indication of thawing upon exposure to a temperature in excess of the thaw temperature, the rate of diffusion of said hydrocarbon oil along said diffusion path being a function, over the range of temperature defined by said pour point, of both the time of exposure to excess temperature and the magnitude of the excess temperature, whereby the time required for development of said visual indication of thawing is correlated with the extent of deterioration of said frozen product.

14. A packaged frozen product according to claim 12 wherein said oil-permeable member is an outer wrapping for the package.

References Cited in the file of this patent

UNITED STATES PATENTS

| | | |
|---|---|---|
| 2,379,459 | Schreiber et al. | July 3, 1945 |
| 2,560,537 | Anderson | July 17, 1951 |
| 2,614,430 | Ballard et al. | Oct. 21, 1952 |